(12) United States Patent
Dudding et al.

(10) Patent No.: US 7,744,105 B2
(45) Date of Patent: Jun. 29, 2010

(54) ISOLATED SPRING CLAMP GROUP

(75) Inventors: Ashley Thomas Dudding, Yorkville, IL (US); William Wilson, Downers Grove, IL (US); Brent Collyer, Welesley (CA); Jerome Lim Cortez, Tinley Park, IL (US); Patrick Williams, Aurora, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 93 days.

(21) Appl. No.: 12/103,086

(22) Filed: Apr. 15, 2008

(65) Prior Publication Data

US 2009/0256328 A1 Oct. 15, 2009

(51) Int. Cl.
*B60G 11/00* (2006.01)
(52) U.S. Cl. .............................. 280/124.175
(58) Field of Classification Search .......... 280/124.175, 280/124.17; 267/43, 47, 52
See application file for complete search history.

(56) References Cited

U.S. PATENT DOCUMENTS

| | | |
|---|---|---|
| 1,924,984 A | 12/1933 | Fageol |
| 2,080,123 A | 5/1937 | Francis |
| 3,305,231 A | 2/1967 | Boughner et al. |
| 3,674,249 A | 7/1972 | McGee |
| 3,767,222 A | 10/1973 | Willetts |
| 3,802,718 A | 4/1974 | Schaeff |
| 3,895,819 A | 7/1975 | Willetts |
| 4,033,608 A | 7/1977 | Sweet et al. |
| 4,322,061 A | 3/1982 | Masser |
| 4,611,793 A | 9/1986 | Nishiyama et al. |
| 4,902,035 A | 2/1990 | Raidel |
| 4,919,399 A | 4/1990 | Selzer et al. |
| 5,133,573 A | 7/1992 | Kijima et al. |
| 5,271,638 A | 12/1993 | Yale |
| 5,470,096 A | 11/1995 | Baxter |

(Continued)

FOREIGN PATENT DOCUMENTS

EP 0 115 696 A2 8/1984

(Continued)

OTHER PUBLICATIONS

PCT Invitation to Pay Additional Fees and, Where Applicable, Protest Fee (Form PCT/ISA/206) and Annex to PCT/ISA/206 Communication Relating to the Results of the Partial International Search from PCT/US2009/039589 dated Jul. 6, 2009.

(Continued)

*Primary Examiner*—Faye M. Fleming
(74) *Attorney, Agent, or Firm*—Cook Alex Ltd.

(57) ABSTRACT

A clamp assembly of a vehicle leaf spring suspension is disclosed. The clamp assembly has an axle bracket secured to a vehicle axle and a top cap secured to the axle bracket by mechanical fasteners to define an axle seat. The axle bracket and top cap may include interlocking keys and keyways to cooperate with the mechanical fasteners in transmitting the load from the vehicle axle. A spring seat of the leaf spring is received within the axle seat and is tapered. The tapered spring seat, when combined with a deformable liner in the axle seat, effectively eliminates the inactive portion of the leaf spring to increase the effective length of the spring and minimize the spring rate.

25 Claims, 4 Drawing Sheets

U.S. PATENT DOCUMENTS

| | | |
|---|---|---|
| 5,476,251 A | 12/1995 | Moses et al. |
| 5,634,655 A | 6/1997 | Chalin |
| 5,938,221 A | 8/1999 | Wilson |
| 5,971,654 A | 10/1999 | Sweeney, Jr. |
| 6,073,946 A | 6/2000 | Richardson |
| 6,485,040 B1 | 11/2002 | Dudding |
| 6,536,789 B2 | 3/2003 | Svensson et al. |
| 6,609,764 B2 | 8/2003 | Dudding et al. |
| 6,616,156 B1 | 9/2003 | Dudding et al. |
| 6,820,884 B2 | 11/2004 | McCann et al. |
| 2005/0077665 A1 | 4/2005 | Platner et al. |
| 2006/0244236 A1 | 11/2006 | Cortez et al. |
| 2006/0290089 A1 | 12/2006 | Dudding et al. |

FOREIGN PATENT DOCUMENTS

| | | |
|---|---|---|
| EP | 0 213 110 A2 | 3/1987 |
| EP | 0 214 388 A1 | 3/1987 |
| EP | 0352541 B1 | 3/1993 |
| EP | 1 278 971 B1 | 4/2006 |
| GB | 946394 | 1/1964 |
| WO | WO 2006/116513 A2 | 11/2006 |

OTHER PUBLICATIONS

The Society of Automotive Engineers, Library of Congress Cataloging in Publication Data, p. 1.22, circa 1990.

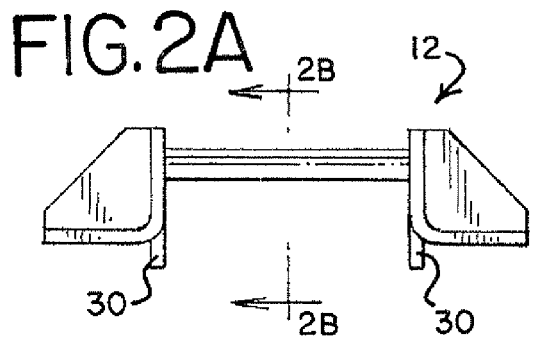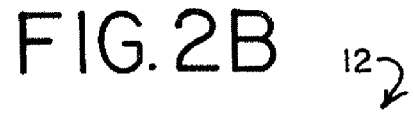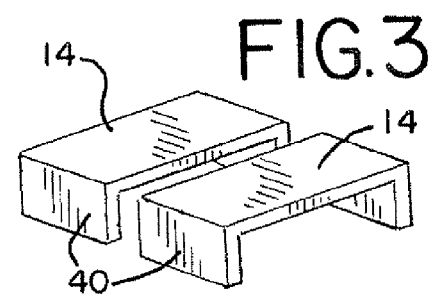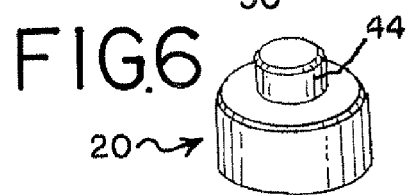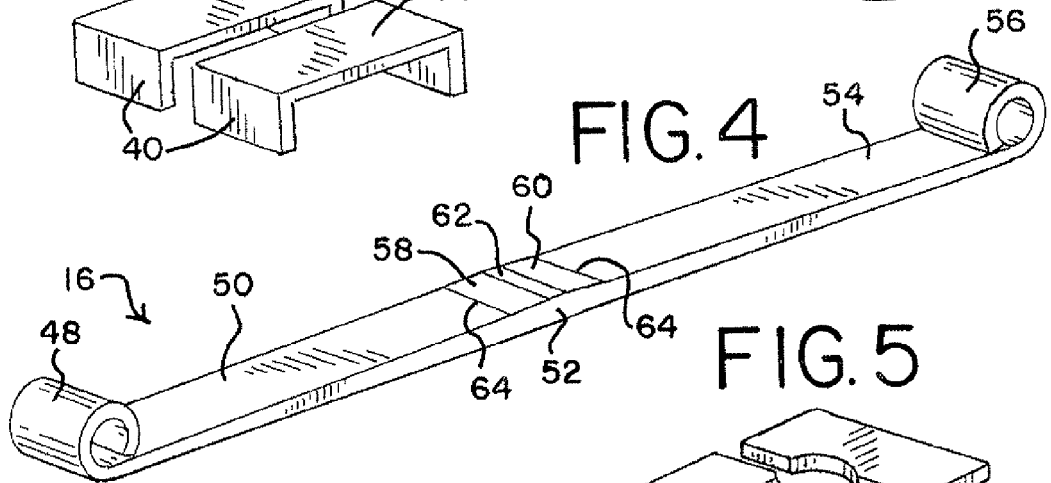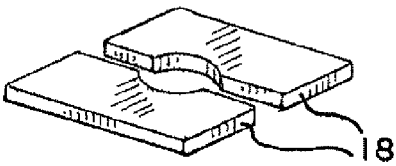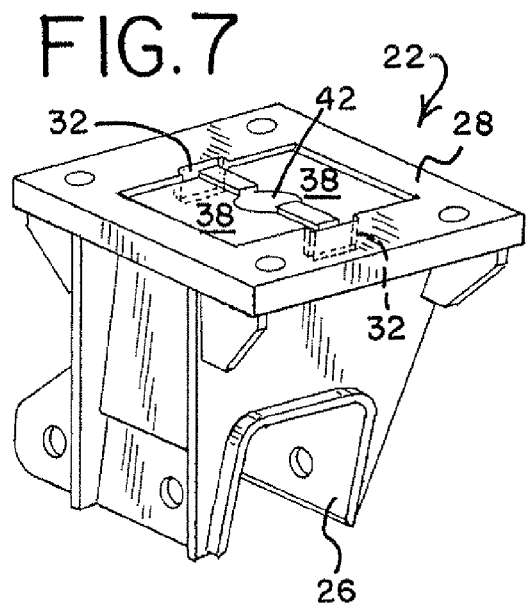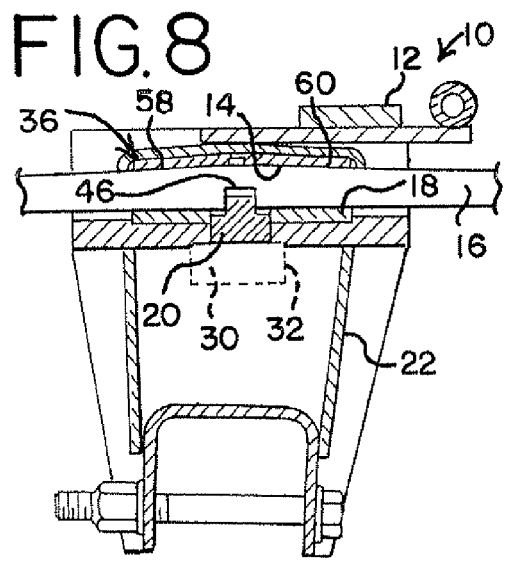

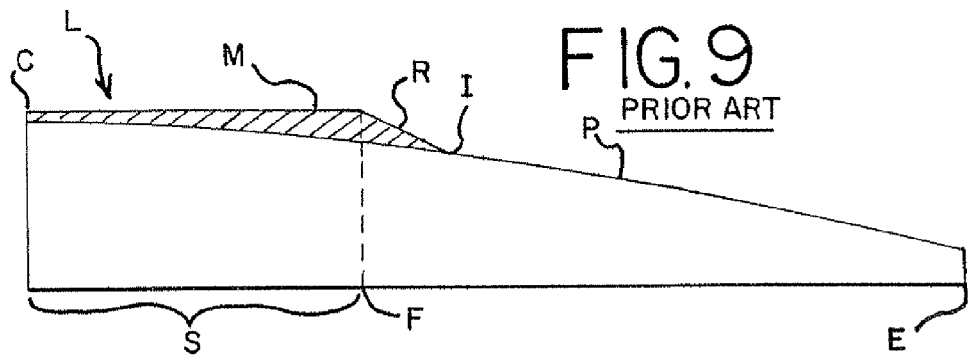
FIG. 9 PRIOR ART
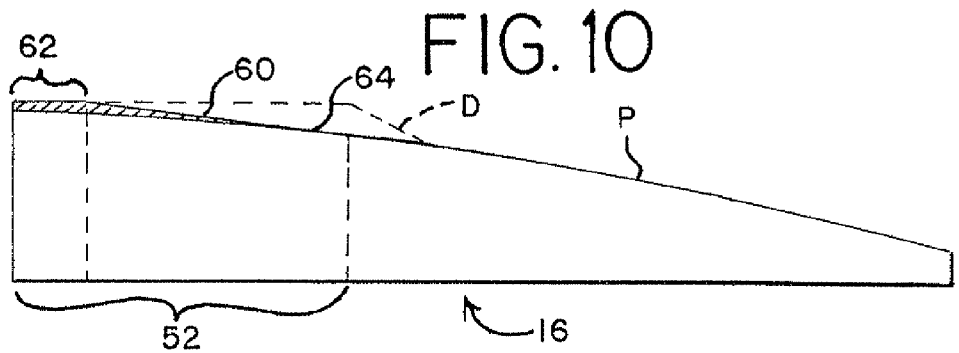
FIG. 10
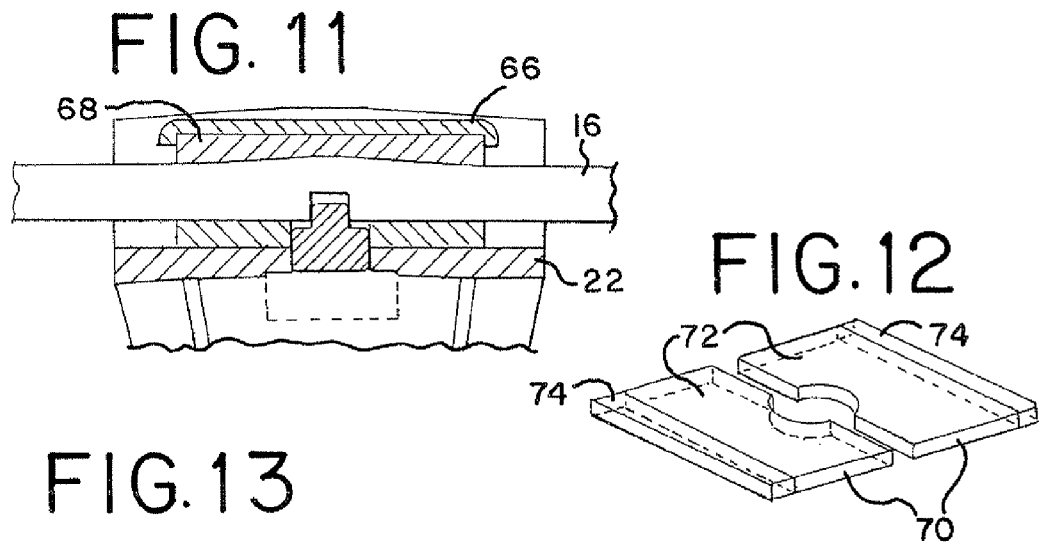
FIG. 11
FIG. 12
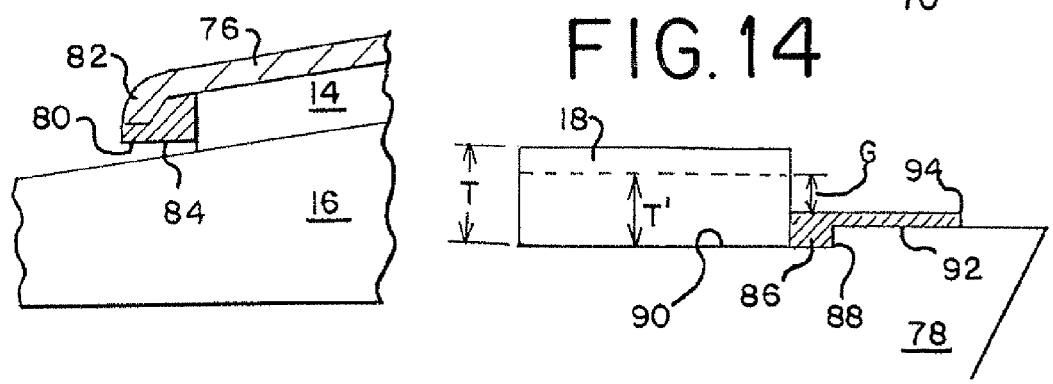
FIG. 13
FIG. 14

ISOLATED SPRING CLAMP GROUP

BACKGROUND

1. Field of the Disclosure

The present subject matter relates to vehicle suspensions and components thereof. More particularly, the present subject matter relates to leaf spring suspensions.

2. Description of Related Art

Leaf springs are commonly used as active components in vehicle suspensions. Examples of suspensions using a leaf spring are shown and described in U.S. Pat. No. 5,938,221, which is hereby incorporated herein by reference.

One of the shortcomings associated with the design of leaf spring suspensions is due to the fact that in order to lower the vertical spring rate to a desirable level, the leaf spring sometimes must be increased in length beyond the packaging constraints of the vehicle. In particular, in certain vehicles, there are limitations on the space available to accommodate the longer length spring required to achieve a lower spring rate for a given suspension.

Contributing to this shortcoming is the manner in which the leaf spring is typically secured to the vehicle axle. In particular, the leaf spring is conventionally secured to the vehicle axle in a way that produces a mechanical metal-to-metal connection between the leaf spring and the axle clamp assembly. This conventional means of connecting the leaf spring to the vehicle axle negates utilization of a section of the leaf spring, namely its spring seat, as part of the active component, giving the leaf spring a shorter effective length than its true physical length and increasing the overall spring rate of the leaf spring. In addition, this metal-to-metal connection can be a limitation of the fatigue life for the leaf spring.

Another shortcoming of known leaf spring suspensions is the manner in which a load is transmitted from an axle by the clamp group. In particular, an axle bracket is typically secured to the axle, with the leaf spring being secured to the axle bracket by an axle clamp assembly top cap and large mechanical fasteners, such as U-bolts. The load from the axle is transmitted by friction generated by the bolts, thereby requiring relatively large bolts to generate adequate clamp force. Even when such larger bolts are used, the regular application of road-generated forces through a friction clamp joint may result in bolt loosening.

Accordingly, it is desirable to overcome one or more of the foregoing shortcomings, or alternatively other shortcomings not specified herein but associated with prior leaf spring suspensions.

SUMMARY

There are several aspects of the present subject matter which may be embodied in the devices and systems described and claimed below. These aspects may be employed alone or in combination with other aspects of the subject matter described herein.

In one aspect, the combination of a clamp assembly for use in a suspension for a vehicle axle and a leaf spring is provided. The clamp assembly comprises an axle bracket adapted to be attached to a vehicle axle; a top cap adapted to be operatively connected to the axle bracket to define an axle seat; and a deformable liner adapted to be at least partially received within the axle seat. The leaf spring has a spring seat adapted to be received within the axle seat, with the liner being positionable between the axle seat and at least a portion of the spring seat of the leaf spring. The spring seat of the leaf spring comprises at least a portion of a front taper and at least a portion of a rear taper.

In another separate aspect, a clamp assembly for use in securing a leaf spring of a suspension for a vehicle axle comprises an axle bracket adapted to be attached to a vehicle axle, the axle bracket including a clamp assembly mounting surface. The clamp assembly also includes a top cap adapted to be operatively connected to the clamp assembly mounting surface of the axle bracket to define an axle seat for receiving at least a portion of a leaf spring. One of said clamp assembly mounting surface and said top cap defines a keyway and the other of said clamp assembly mounting surface and said top cap includes a key protruding therefrom and adapted to be received within the keyway when the top cap is operatively connected to said clamp assembly mounting surface.

In a further separate aspect, the combination of a clamp assembly for use in a suspension for a vehicle axle and a leaf spring is provided. The clamp assembly comprises an axle bracket adapted to be attached to a vehicle axle, the axle bracket including a clamp assembly mounting surface. The clamp assembly further comprises a top cap adapted to be operatively connected to the clamp assembly mounting surface of the axle bracket to define an axle seat and a deformable liner adapted to be at least partially received within the axle seat. The leaf spring having a spring seat adapted to be received within the axle seat, wherein the liner is positionable between the axle seat and at least a portion of the spring seat of the leaf spring. Additionally, one of said clamp assembly mounting surface and said top cap defines a keyway and the other of said clamp assembly mounting surface and said top cap includes a key protruding therefrom and adapted to be received within the keyway when the top cap is operatively connected to said clamp assembly mounting surface.

In yet another separate aspect, a deformable liner is provided. The liner is receivable within an axle seat of a suspension for a vehicle axle and comprises top and bottom surface, each having a front edge and a rear edge. A cavity is defined between the top surface and the bottom surface for receiving at least a portion of a leaf spring. A pad seat is defined in one of the top and bottom surfaces and a deformable auxiliary pad is at least partially received within the pad seat.

BRIEF DESCRIPTION OF THE DRAWINGS

In the following detailed description, reference will frequently be made to the following views of the drawing, in which like reference numerals refer to like components, and in which:

FIG. 2A is an end view of the top cap of FIG. 2;

FIG. 2B is a cross-sectional view of the top cap of FIGS. 2 and 2A, taken through the line 2B-2B of FIG. 2A;

FIG. 3 is a perspective view of a top liner of the clamp assembly of FIG. 1;

FIG. 4 is a perspective view of the leaf spring of FIG. 1;

FIG. 5 is a perspective view of a bottom liner of the clamp assembly of FIG. 1;

FIG. 6 is a perspective view of a dowel pin of the clamp assembly of FIG. 1;

FIG. 7 is a perspective view of an axle bracket of the clamp assembly of FIG. 1;

FIG. 8 is a cross-sectional view of the clamp assembly of FIG. 1 in an assembled condition;

FIG. 9 is a schematic view of a portion of a typical leaf spring;

FIG. 10 is a schematic view of a portion of a leaf spring constructed in accordance with the principles and teachings set forth herein;

FIG. 11 is a cross-sectional view of an alternative clamp assembly constructed in accordance with the principles and teachings set forth herein;

FIG. 12 is a perspective view of an alternative liner suitable for use in clamp assemblies constructed in accordance with the principles and teachings set forth herein;

FIG. 13 is a cross-sectional view of a top cap employing an auxiliary pad;

FIG. 14 is a cross-sectional view of an axle bracket employing an auxiliary pad;

DESCRIPTION OF THE ILLUSTRATED EMBODIMENTS

The embodiments disclosed herein are for the purpose of providing the required description of the present subject matter. These embodiments are only exemplary, and may be embodied in various forms. Therefore, specific details disclosed herein are not to be interpreted as limiting the subject matter as defined in the accompanying claims.

Figure 1:
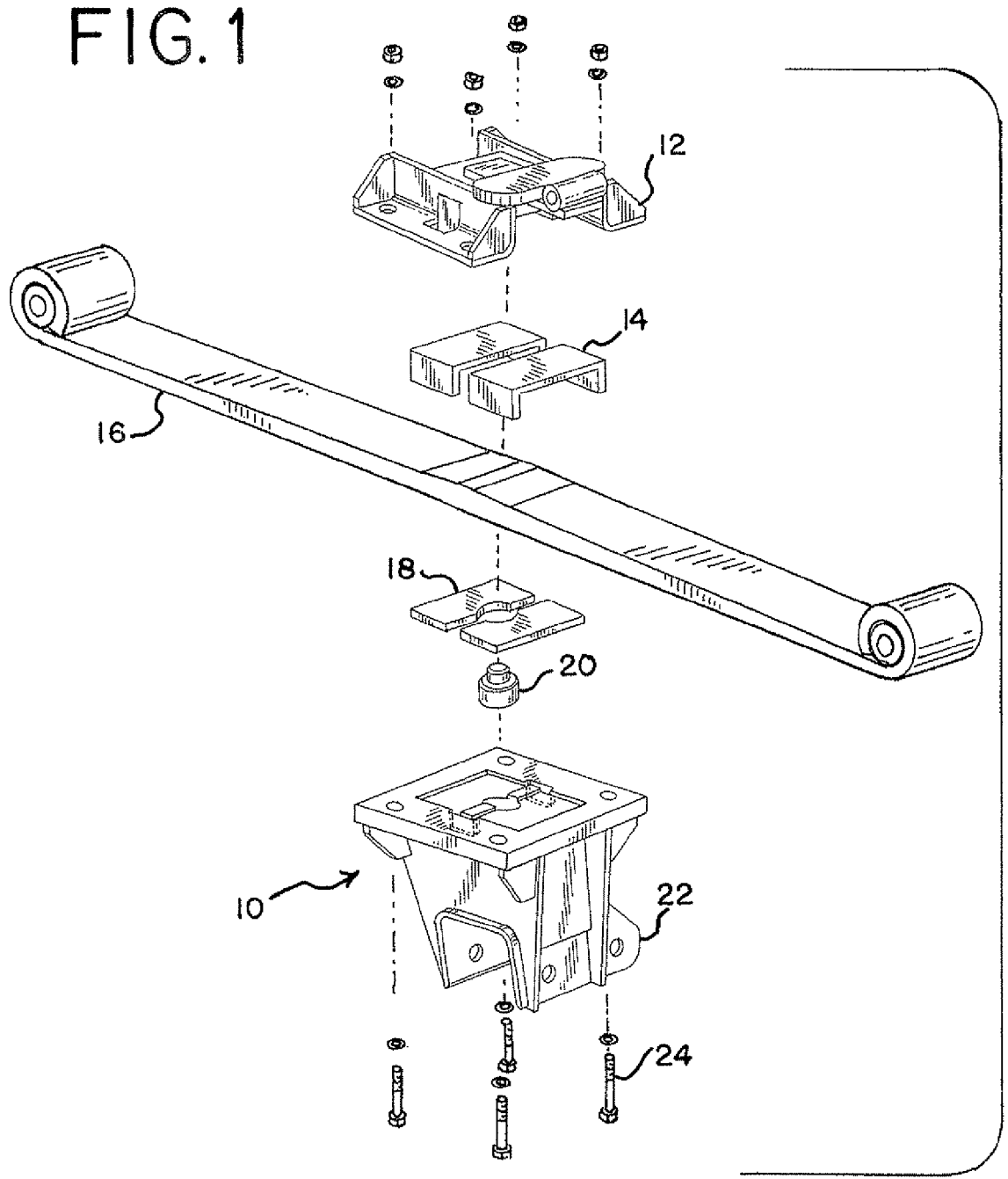
FIG. 1 is an exploded view of a leaf spring and a clamp assembly constructed in accordance with the principles and teachings set forth herein.

FIG. 1 illustrates an exemplary active clamp assembly or active clamp group 10 and a leaf spring 16. The components of the pictured active clamp assembly 10 include a top cap 12 (FIGS. 2-2B), one or more deformable top liners 14 (FIG. 3), one or more deformable bottom liners 18 (FIG. 5), a dowel pin 20 (FIG. 6), an axle bracket 22 (FIG. 7), and a plurality of mechanical fasteners 24 to secure the top cap 12 to the axle bracket 22. FIG. 8 is a cross-sectional view of the assembled active clamp assembly 10, taken through the longitudinal centerline of the leaf spring 16.

In a typical application, a seat portion 26 of the axle bracket 22 (FIG. 7) is press-fit to the top of a vehicle axle (not illustrated) and secured thereto by appropriate means, such as mechanical fasteners or welds. U.S. Patent Application Publication No. 2006/0244236 illustrates and describes a number of methods for securing an axle bracket to an axle and is hereby incorporated herein by reference. Active clamp assemblies according to the present disclosure are not limited to a particular vehicle or axle design, but may find particular utility when used as part of the suspension of a commercial vehicle or automobile. Other applications are also possible, especially those in which it would be advantageous to use a relatively short leaf spring to perform work within a durable clamp group, such as in amusement park rides, manufacturing equipment, farm equipment, material holding equipment, construction vehicles and equipment, and mining vehicles and equipment.

The top surface of the axle bracket 22 (FIG. 7) defines a clamp assembly mounting surface 28 to which the top cap 12 is secured by the mechanical fasteners 24. In addition to the mechanical fasteners 24, the top cap 12 of FIGS. 2-2B includes at least one downwardly extending flange or key 30 that is received in a corresponding keyway or opening 32 of the clamp assembly mounting surface 28. FIG. 8 shows (in broken lines) a key 30 being received within a keyway 32.

In the illustrated embodiment, there is a key 30 positioned at or adjacent to each lateral side of the top cap 12, with the clamp assembly mounting surface 28 defining a pair of keyways 32 to accommodate the keys 30. Alternatively, the keys may be extensions from the axle bracket, with the top cap defining keyways to receive the keys, or each of the top cap and the axle bracket may be provided with at least one key and at least one keyway to mate with the keyway/key of the other component.

Those skilled in the art will be familiar with a typical clamping arrangement, whereby a leaf spring is secured to the axle bracket strictly by mechanical fasteners, such as U-bolts. All of the tangential loads and torques normal to the mating surfaces experienced by the axle bracket is transmitted through friction in the clamped joint, so the mechanical fasteners must be relatively large, for example three-quarter inch bolts, to generate adequate clamp force. The present keying interconnection between the axle bracket 22 and the top cap 12 provides an additional avenue for the transmission of loads from the axle. More particularly, the keying interconnection allows some of the force to be transmitted through the clamp assembly mechanically, thereby decreasing the amount of force that must be transmitted via the mechanical fasteners 24. As a result, smaller fasteners may be used without decreasing the ability of the clamp assembly to transmit force. For example, it has been found that a clamp assembly incorporating the illustrated keying system allowed for the use of five-eighth inch bolts rather than three-quarter inch bolts, saving weight and cost for the suspension.

Figure 2:
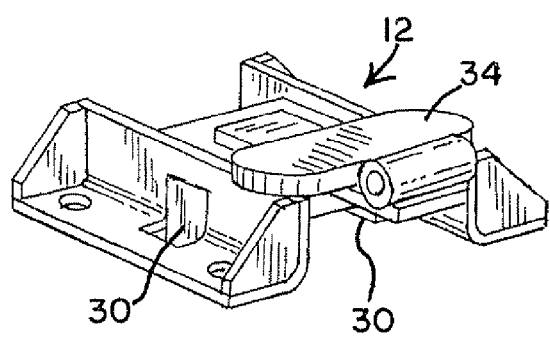
FIG. 2 is a perspective view of a top cap of the clamp assembly of FIG. 1.

As shown in FIGS. 2-2B, the top cap 12 may also include a shock bracket 34 to which the bottom end of a shock absorber may be secured, in a manner well known to those skilled in the art. The upper surface of the top cap 12 may be used as an attachment point for an air spring, as is also well known to those skilled in the art.

The assembled top cap 12 and axle bracket 22 define an axle seat, generally indicated at 36 in FIG. 8, in which the middle section of the leaf spring 16 is secured. To separate the metallic leaf spring 16 from the metallic top cap 12 and axle bracket 22, elastomeric liners 14 and 18 may be secured in the axle seat 36, directly above and below the leaf spring 16. In one embodiment, the top cap is sized and configured to compress the deformable material around the clamped portion of the leaf spring, such that the forces due to such compression contain the leaf spring longitudinally and laterally. With this clamping technique, the clamped section of the leaf spring 16 is encapsulated by the liners 14 and 18 and there is no hard mechanical (i.e. metal-to-metal) connection.

In the illustrated embodiment, there are two top liners 14 (FIG. 3) and two bottom liners 18 (FIG. 5). The bottom liners 18 may be seated within two pockets 38 in the clamp assembly mounting surface 28 of the axle bracket 22 (FIG. 7) to prevent them from shifting during use. The top liners 14 may similarly be seated within pockets in the underside of the top cap 12 (not illustrated) to prevent them from shifting during use. In the illustrated embodiment, one liner (the top liner 14) includes extending portions 40 to abut the side of the leaf spring and separate the sides of the leaf spring from the axle seat. Other configurations are also possible, such as a one-piece top liner and/or a one-piece bottom liner. Further, the term "liner" is used broadly herein to refer to any deformable material suitable for positioning between the leaf spring and the axle seat and is not limited to a separate insert, but may be variously provided, such as in the form of a deformable coating applied to the clamped section of the leaf spring.

In addition to eliminating metal-to-metal contact between the leaf spring and the axle seat, another benefit of using deformable material between the leaf spring and the axle seat is the reduction of the inactive or ineffective length of the leaf spring. In particular, a typical leaf spring is secured within a clamp by a metal-to-metal connection that limits the ability of the clamped portion of the spring to deflect. The inactive length of the leaf spring is estimated to be equal to one half of the clamped length of the leaf spring (i.e., half the distance between the mechanical fasteners that secure the top and bottom clamping members to each other) and is not used when calculating the spring rate of the spring. The spring rate increases/decreases to the cube of length, so decreasing the inactive length of the leaf spring will increase its effective length, thereby significantly decreasing the spring rate. The presence of a deformable liner effectively eliminates the inactive length of the leaf spring by separating the clamped portion of the spring from the axle seat, thereby allowing for full deflection within the axle seat. It should be noted, however, that an elastomeric liner alone, without a leaf spring according to the present disclosure, will not fully optimize the performance of the suspension, because typical leaf springs are relatively thick and stiff at their midsection, thereby limiting the amount of deflection of the clamped portion, even in the presence of a suitable liner. Leaf springs according to the present disclosure will be described in greater detail herein.

The force applied by the mechanical fasteners 24 may be sufficient to retain the leaf spring 16 in position within the axle seat, but it may be advantageous to provide additional means to ensure that the leaf spring 16 does not become dislodged. For example, in the illustrated embodiment, the axle bracket 22 includes a dowel pin seat 42 (FIG. 7) adapted to receive a dowel pin 20 (FIG. 6). The top portion 44 of the dowel pin 20 extends above the top surface of the axle bracket and passes through an opening of the bottom liner 18 to be received within a centering hole 46 in the bottom of the leaf spring 16 (FIG. 8), thereby retaining the leaf spring 16 in position.

The illustrated leaf spring 16 (FIG. 4) is a single leaf spring comprised of five general sections. The first section of the leaf spring 16 includes a front connection member 48, illustrated as a front spring eye. The second section of the leaf spring 16 is a front limb 50, which extends generally rearwardly from the front connection member 48 to the front portion of the active clamp assembly 10. The third section of the leaf spring 16 is the spring seat 52, which corresponds to that section of the leaf spring that is secured within the axle seat 36 defined between the top cap 12 and the axle bracket 22 of the active clamp assembly 10 (FIG. 8). The spring seat 52 is at least partially tapered, as will be described in greater detail herein. The fourth section of the leaf spring 16 is a rear limb 54, which extends generally from the rear portion of the active clamp assembly 10 to a rear connection member 56 of the leaf spring 16. The rear connection member 56 comprises the fifth section of the leaf spring 16 and is illustrated in FIGS. 1 and 4 as a rear spring eye.

The limbs 50, 54 and the connection members 48, 56 of the leaf spring 16 may be variously provided without departing from the scope of the present disclosure. For example, the limbs may be generally identical to each other or differently configured, such as a rear limb that is longer and thinner than the front limb of the leaf spring, depending on the desired spring characteristics. Further, additional components, such as a half leaf secured to the front limb and connection member, may also be practiced without departing from the scope of the present disclosure.

As shown in FIGS. 1 and 4, the spring seat 52 of the leaf spring 16 is at least partially tapered, including at least a portion of a front taper 58 and at least a portion of a rear taper 60. In the illustrated embodiment, the spring seat 52 has a maximum thickness at a generally flat (i.e., non-tapered) midsection 62, before decreasing in thickness at the tapers 58 and 60. The length of the tapers is not limited by the size of the spring seat 52, and the tapers 58 and 60 may extend beyond the spring seat 52 to the unclamped limbs 50, 54 of the leaf spring 16.

The tapers can be understood with reference to the auxiliary tapers of a typical leaf spring L, a portion of which is illustrated in FIG. 9. The location of a mechanical fastener, which corresponds to the outer boundary of the axle seat, is generally indicated at F. The ideal thickness of a leaf spring is defined by a parabola P, with the leaf spring having a maximum thickness at its center C and a minimum thickness at its ends E. The parabolic equation for thickness is:

$$t = k\sqrt{x},$$

where "t" is the thickness of the leaf spring,

"k" is a parabolic constant, which is 0.2 in one embodiment, and

"x" is the distance from the end of the leaf spring, where "x" does not exceed the distance from the end of the leaf spring to its center.

The above equation can be used to design the ideal thickness of one half of the leaf spring, with the other half of the spring being a mirror image.

Rather than having a thickness defined by such theoretical parabola P, a typical leaf spring L has a substantially uniform thickness along the length of the entire spring seat S. FIG. 9 shows such excess material M (the shaded area) at the spring seat S, which excess material is typically referred to as "seat protection," because it serves to protect the spring L from fretting and failing as a result of metal-to-metal contact with the clamp.

At an unclamped section directly adjacent to the spring seat S, the leaf spring L includes a substantially linear auxiliary taper R that gradually decreases the thickness of the leaf spring. At the outermost unclamped section of the leaf spring (i.e., the section between the auxiliary taper R and the end E of the leaf spring L), the thickness of the leaf spring approximates the thickness dictated by the theoretical parabola P. The leaf spring transitions from the auxiliary taper R to follow the theoretical parabola P at the point at which the auxiliary taper R intersects the theoretical parabola P, indicated generally at I.

In contrast to the typical leaf spring, a side view of a portion of a leaf spring 16 according to the present disclosure is shown in FIG. 10. The leaf spring 16, as shown in FIG. 10, has a relatively short midsection 62 that transitions to the taper 60 in the spring seat 52, before transitioning to a profile approximating the theoretical parabola P at the intersection point between the taper 60 and the parabola P, generally indicated at 64. Such intersection point is typically imperceptible, but is shown in FIGS. 1 and 4 for illustrative purposes.

The taper 60 beginning in the spring seat 52 has a number of consequences. Principally, it eliminates a portion of the thickness of the typical leaf spring (shown in broken lines in FIG. 10 and indicated generally at D), thereby reducing the amount of "seat protection" and, therefore, the weight of the suspension. The amount of "seat protection" may be so decreased without harming performance because the presence of the elastomeric liner surrounding the spring eliminates metal-to-metal contact.

Eliminating some of the thickness of the leaf spring has the added benefit of decreasing the spring rate of the leaf spring 16. As described previously, the presence of a deformable liner in the axle seat effectively eliminates the inactive length of the spring, but does not optimize the performance of the suspension due to the relatively thick and stiff midsection of a typical leaf spring. However, combining a tapered leaf spring with a deformable liner effectively eliminates the inactive length of the spring while decreasing the stiffness of the clamped portion of the leaf spring. Accordingly, for a given spring length, leaf springs according to the present disclosure have a lower spring rate than a typical leaf spring (used with or without elastomeric material in the clamp group) because of the relatively thin clamped portion. It will also be seen that the spring rate of a typical leaf spring may be achieved by a shorter leaf spring having a tapered spring seat. Hence, leaf springs according to the present disclosure may be employed to decrease the size and weight of the suspension, thereby improving performance while decreasing manufacturing costs.

The fact that the inactive length of the leaf spring has been eliminated allows for more design flexibility as well. For example, the length of the axle seat may be increased or decreased without significantly affecting the performance of the leaf spring 16. Decreasing the length of the axle seat may be advantageous to lower the weight and cost of the suspension, and may be done because there is no metal-to-metal contact and, hence, no need for an elongated clamp to minimize fretting. Alternatively, it may be advantageous to increase the length of the axle seat to allow for a longer liner having more surface area for gripping the leaf spring 16 to prevent it from shifting within the axle seat. The length of the axle seat may be increased without degrading the performance of the leaf spring because the combination of the deformable liner and the tapered spring seat of the leaf spring effectively eliminates the inactive length of the spring within the axle seat.

In the illustrated embodiment, the tapers 58 and 60 are substantially identical, with each having a substantially linear profile. Other tapers may also be practiced without departing from the scope of the present disclosure, such as non-identical tapers and/or a taper with a substantially non-linear profile. Similarly, while it may be advantageous for the midsection 62 to have a generally uniform thickness (e.g., to help maintain the spring seat in the proper clamped position and resist lateral or longitudinal shifting), other profiles (e.g., pointed or rounded) may also be practiced without departing from the scope of the present disclosure.

A variety of modifications may be employed with clamp assemblies according to the present disclosure. For example, FIG. 8 illustrates a tapered top cap 12, with a liner 14 having a generally uniform thickness, providing generally uniform compression. If non-uniform compression is desired, the top cap may be differently shaped to accommodate a liner having a varying thickness. FIG. 11 shows a top cap 66 having a generally planar profile, which accommodates a liner 68 that is thicker at its front and rear edges than at its midsection. Other top cap and liner profiles are also possible. Also, the same principle may be applied to reconfigure the pockets 38 of the axle bracket 22 to accommodate a bottom liner 18 having a varying thickness (not illustrated).

As for the liners, they may be provided with a compound construction, as illustrated in FIG. 12. In the illustrated liner 70 (which is illustrated as a two-piece unit, but may be otherwise provided), a relatively low stiffness section 72 is secured to an adjacent, relatively high stiffness section 74. It may be advantageous to position the liner 70 with the high stiffness section(s) 74 toward the front and/or rear of the axle seat to provide more support during braking or other extreme operating conditions, thereby preventing excessive leaf spring rocking, which could otherwise risk compression set in the liner. Such an embodiment may be especially desirable if the leaf spring is configured to rock about its midpoint, because there may be a greater tendency to compress the front and rear ends of the liner when the leaf spring pivots.

Yet another modification may be made to the clamp assembly to avoid compression set in the event of braking, leaf spring rocking, or the like. FIG. 13 shows a front or rear portion of an alternative top cap 76 and FIG. 14 shows a front or rear portion of an alternative axle bracket 78. The alternative top cap 76 and the alternative axle bracket 78 may be practiced separately or together.

The top cap 76 of FIG. 13 is substantially the same as the top caps previously described herein, with the exception that a deformable auxiliary pad or snubber 80 is secured at or adjacent to the front and/or rear edge 82 of the top cap 76, such that the auxiliary pad 80 is positioned generally within the axle seat formed between the top cap 76 and an axle bracket. As described previously, there may be times when the leaf spring 16 rocks forward or backward, so the addition of the auxiliary pad 80 will act as a stop to prevent the leaf spring 16 from rocking excessively and causing compression set in the liner 14 or metal-to-metal contact between the top cap 76 and the leaf spring 16. It may be advantageous for the auxiliary pad 80 to comprise an elastomeric material having a higher durometer or stiffness than the liner 14 to ensure that the auxiliary pad 80 acts to prevent further compression of the liner 14, rather than yielding during extreme operating conditions.

The auxiliary pad 80 may be variously configured without departing from the scope of the present disclosure. For example, the auxiliary pad 80 may be thinner than the associated liner 14 when the liner 14 is in an uncompressed state, as shown in FIG. 13. It may be advantageous for the auxiliary pad to be thinner than the liner 14 when the liner 14 is in a compressed state (not illustrated) to allow for a gap between the auxiliary pad 80 and the leaf spring 16 during normal compression. Such a configuration may be advantageous to allow for some leaf spring deflection before the auxiliary pad 80 contacts the leaf spring 16. Further, a thinner auxiliary pad may be advantageous to ensure that the liner 14 operates unimpeded during vertical and/or longitudinal loading.

Also, as shown in FIG. 13, the auxiliary pad 80 may be sized and configured to abut the end of the associated liner 14. This may be advantageous to prevent the liner 14 from shifting within the axle seat during use.

Additionally, in the embodiment of FIG. 13, the auxiliary pad 80 is provided with a generally planar bottom surface 84. Other configurations, such as an auxiliary pad having a non-planar bottom surface are also possible.

As for the axle bracket 78 of FIG. 14, it is based on the same principle as the top cap 76 of FIG. 13. In particular, it includes a deformable auxiliary pad or snubber 86 secured at or adjacent to the front and/or rear edges 88 of a pocket 90 of the axle bracket 78, such that the auxiliary pad 86 is positioned generally within the axle seat formed between a top cap and the axle bracket 78. As described above with reference to the auxiliary pad 80 of FIG. 13, the auxiliary pad 86 of FIG. 14 serves to protect the associated liner 18 from compression set and eliminates the occurrence of metal-to-metal contact between the axle bracket 78 and the leaf spring in the event of extreme operating conditions. To ensure that there is no metal-to-metal contact between the axle bracket 78 and the leaf spring, a portion 92 of the auxiliary pad 86 may extend outside of the pocket 90, at least to the position at which the axle bracket 78 and leaf spring would contact each other during extreme rocking of the leaf spring.

As described above, there may be times when the leaf spring rocks forward or backward, so the addition of the auxiliary pad 86 will prevent the leaf spring from rocking excessively and causing compression set in the liner 18 or metal-to-metal contact between the axle bracket 78 and the leaf spring. It may be advantageous for the auxiliary pad 86 to comprise an elastomeric material having a higher durometer or stiffness than the liner 18 to ensure that the auxiliary pad 86 acts to prevent further compression of the liner 18, rather than yielding during extreme operating conditions.

In FIG. 14, T represents the uncompressed thickness of the liner 18, while T' represents the compressed thickness of the liner 18, and the distance between the leaf spring and the auxiliary pad 86 when the liner 18 is compressed is generally indicated at G. Hence, the illustrated auxiliary pad 86 is generally thinner than the liner 18, such that there is a gap G between the auxiliary pad 86 and the leaf spring, even when the liner 18 has been compressed. Such a configuration may be advantageous to allow for some leaf spring rocking before the auxiliary pad 86 contacts the leaf spring. Further, a thinner auxiliary pad may be advantageous to ensure that the liner 18 operates unimpeded during vertical and/or longitudinal loading.

Also, as shown in FIG. 14, the auxiliary pad 86 may be sized and configured to abut the end of the associated liner 18. This may be advantageous to prevent the liner 18 from shifting within the axle seat during use.

Additionally, in the embodiment of FIG. 14, the auxiliary pad 86 is provided with a generally planar top surface 94. Other configurations, such as an auxiliary pad having a non-planar bottom surface are also possible.

Figure 15:
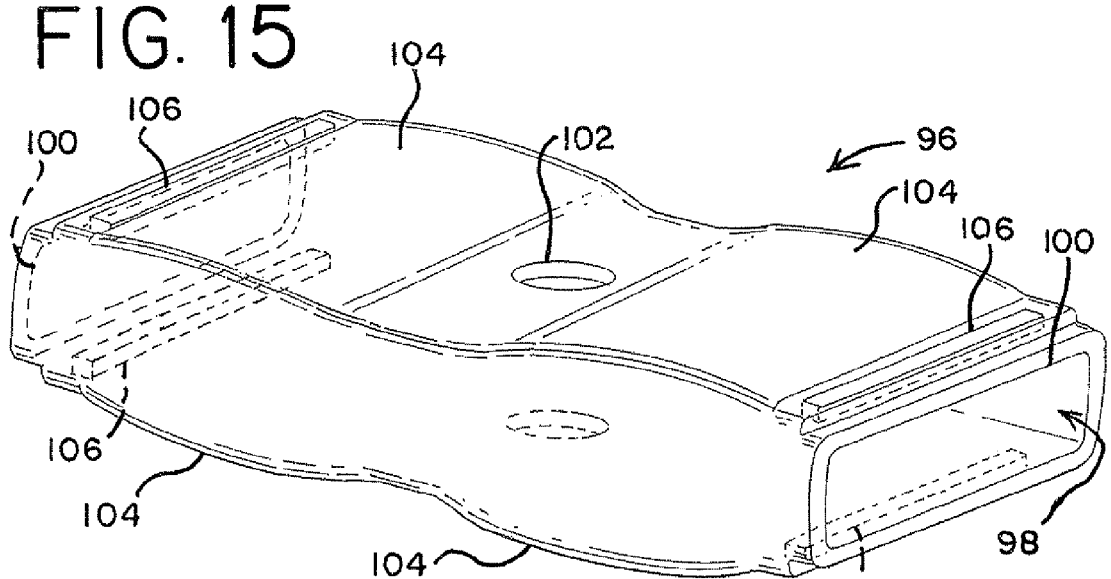
FIG. 15 is a top perspective view of an alternative liner.
Figure 17:
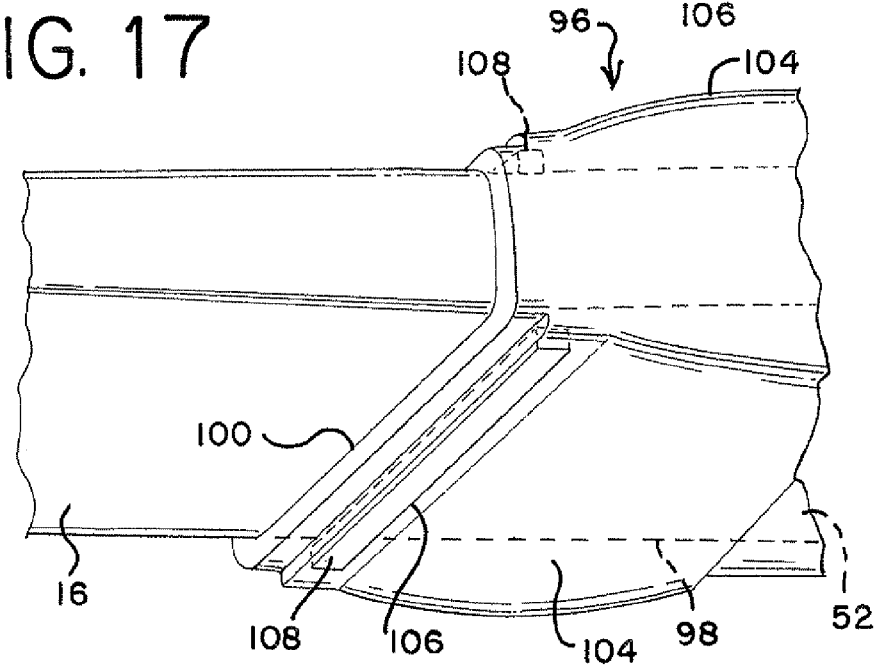
FIG. 17 is a bottom perspective view of the liner and leaf spring of FIG. 15.
Figure 16:
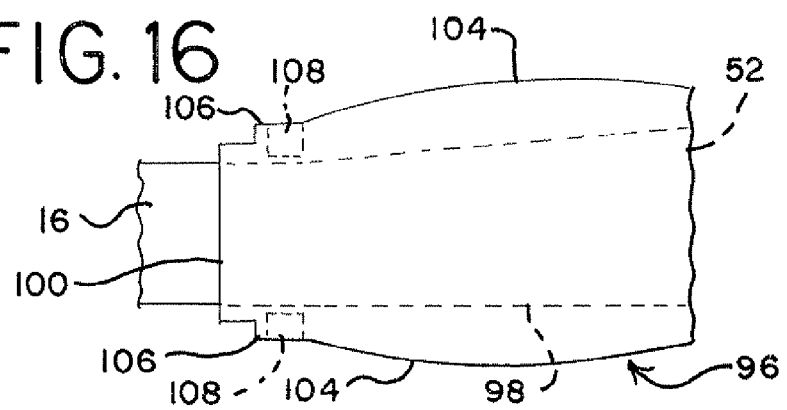
FIG. 16 is a side elevational view of the liner of FIG. 15 incorporating an auxiliary pad and receiving a leaf spring.

FIGS. 15-17 illustrate yet another embodiment of a liner 96 suitable for use with a suspension assembly according to the present disclosure. The liner 96 is provided in the form of a sleeve having a one-piece configuration, in contrast to the multiple-piece liner configuration illustrated in FIG. 1. The liner 96 is comprised of a deformable material such as, for example, an elastomer, and defines a cavity 98 for receiving the spring seat 52 of a leaf spring 16, as shown in FIGS. 16 and 17. The portion of the leaf spring 16 received within the cavity 98 is substantially surrounded by the liner 96, although it may be advantageous for such portion to be entirely surrounded by the liner 96 to eliminate metal-to-metal contact between the leaf spring 16 and the axle seat.

The liner 96 includes front and rear openings 100 for sliding the leaf spring 16 longitudinally into the cavity 98. The liner may be provided with a flap, longitudinal slit, or the like to allow it to be at least partially opened, which may simplify installation of the leaf spring. To further simplify installation, the liner may be substantially symmetrical, such that the leaf spring can be installed without regard to whether it is upside-down or right-side up.

The illustrated liner 96 also includes features calculated to cooperate with the suspension assembly described herein, such as an opening 102 through which the top portion 44 of a dowel pin 20 may pass and outwardly curved or projecting sections 104 to be received within pockets of the axle bracket or top cap.

The liner 96 may further include one or more pad seats 106 (FIG. 15) for receiving deformable auxiliary pads 108 (FIGS. 16 and 17). In the illustrated embodiment, there are two pad seats 106 on each of the top and bottom sides of the liner 96, one at the front edge and one at the rear edge. The pads 108 may be provided substantially according to the foregoing description, being comprised of an elastomeric material with a durometer or stiffness greater than that of the liner 96 and being positioned to coincide with the front and rear edges of the spring seat 52 of the leaf spring 16 to avoid metal-to-metal contact and compression set. The auxiliary pads 108 may be secured in their respective pad seats 106 by any of a number of means, such as an adhesive or a press-fit. To simplify assembly and reduce costs, the auxiliary pads may be substantially identical, but differently shaped auxiliary pads and differently positioned pad seats may also be employed without departing from the scope of the present disclosure.

The illustrated liner 96 may also provide a sealing function to prevent debris from collecting in the axle seat of the suspension assembly. As shown in FIGS. 16 and 17, the liner 96 may fit snugly against the leaf spring 16, thereby preventing debris from collecting between the liner 96 and the leaf spring 16. Similarly, the front and rear edges of the top and bottom sides of the liner 96 (i.e., the areas adjacent to the illustrated pad seats 106) may be configured to abut the top cap/axle bracket to prevent debris from collecting between the liner 96 and the axle seat.

While this invention has been described with reference to certain illustrative aspects, it will be understood that this description shall not be construed in a limiting sense. Rather, various changes and modifications can be made to the illustrative embodiments without departing from the true spirit and scope of the invention, as defined by the following claims. Furthermore, it will be appreciated that any such changes and modifications will be recognized by those skilled in the art as an equivalent to one or more elements of the following claims, and shall be covered by such claims to the fullest extent permitted by law.

The invention claimed is:

1. A suspension assembly comprising, in combination:
   a clamp assembly for use in a suspension for a vehicle axle, comprising
      an axle bracket adapted to be attached to a vehicle axle;
      a top cap adapted to be operatively connected to the axle bracket to define an axle seat; and
      a deformable liner adapted to be at least partially received within the axle seat; and
   a leaf spring having a spring seat adapted to be received within the axle seat, wherein the liner is positionable between the axle seat and at least a portion of the spring seat of the leaf spring, the spring seat of the leaf spring comprises at least a portion of a front taper and at least a portion of a rear taper, and at least one of the front taper and the rear taper is configured to extend outside of the axle seat when the spring seat of the leaf spring is received within the axle seat.

2. The suspension assembly of claim 1, wherein the spring seat of the leaf spring further comprises a generally non-tapered portion between the front taper and the rear taper.

3. The suspension assembly of claim 1, wherein the front taper and the rear taper are configured to extend outside of the axle seat when the spring seat of the leaf spring is received within the axle seat.

4. The suspension assembly of claim 1, wherein the front and rear tapers are substantially identical.

5. The suspension assembly of claim 1, wherein the front and rear tapers each have a substantially linear profile.

6. The suspension assembly of claim 1, wherein the top cap is tapered and the portion of the liner adapted to be positioned between the top cap and the spring seat of the leaf spring has a generally uniform thickness.

7. The suspension assembly of claim 1, wherein the top cap is generally planar and the portion of the liner adapted to be positioned between the top cap and the spring seat of the leaf spring has a non-uniform thickness.

8. A suspension assembly comprising, in combination:
a clamp assembly for use in a suspension for a vehicle combination:
an axle bracket adapted to be attached to a vehicle axle;
a top cap adapted to be operatively connected to the axle bracket to define an axle seat;
a deformable liner adapted to be at least partially received within the axle seat; and
a deformable auxiliary pad secured at or adjacent to a front and/or rear edge of the top cap or the axle bracket,
wherein the auxiliary pad is at least partially received within the axle seat; and
a leaf spring having a spring seat adapted to be received within the axle seat, wherein the liner is positionable between the axle seat and at least a portion of the spring seat of the leaf spring, and wherein the spring seat of the leaf spring comprises at least a portion of a front taper and at least a portion of a rear taper.

9. The suspension assembly of claim 8, wherein the auxiliary pad has a greater stiffness than the liner.

10. The suspension assembly of claim 8, wherein the liner has a greater thickness than the auxiliary pad.

11. The suspension assembly of claim 8, wherein the auxiliary pad is configured to abut a front or rear end of the liner.

12. A suspension assembly comprising, in combination:
a clamp assembly for use in a suspension for a vehicle axle, comprising
an axle bracket adapted to be attached to a vehicle axle;
a top cap adapted to be operatively connected to the axle bracket to define an axle seat;
a deformable liner adapted to be at least partially received within the axle seat; and
a pocket defined by one of the top cap and the axle bracket and adapted to receive at least a portion of the liner and
a deformable auxiliary pad secured at or adjacent to a front or rear edge of the pocket, wherein the auxiliary pad is at least partially received within the axle seat; and
a leaf spring having a spring seat adapted to be received within the axle seat, wherein the liner is positionable between the axle seat and at least a portion of the spring seat of the leaf spring, and wherein the spring seat of the leaf spring comprises at least a portion of a front taper and at least a portion of a rear taper.

13. The suspension assembly of claim 12, wherein the auxiliary pad has a greater stiffness than the liner.

14. The suspension assembly of claim 12, wherein the liner has a greater thickness than the auxiliary pad.

15. The suspension assembly of claim 12, wherein the auxiliary pad is configured to abut a front or rear end of the liner.

16. A clamp assembly for use in securing a leaf spring of a suspension for a vehicle axle, comprising:
an axle bracket adapted to be attached to a vehicle axle, the axle bracket including a clamp assembly mounting surface; and
a top cap adapted to be operatively connected to the clamp assembly mounting surface of the axle bracket to define an axle seat for receiving at least a portion of a leaf spring, wherein one of said clamp assembly mounting surface and said top cap defines a keyway and the other of said clamp assembly mounting surface and said top cap includes a key protruding therefrom and adapted to be received within the keyway when the top cap is operatively connected to said clamp assembly mounting surface.

17. The clamp assembly of claim 16, wherein the top cap comprises a plurality of keys and the clamp assembly mounting surface defines a plurality of keyways.

18. The clamp assembly of claim 17, wherein the top cap has a pair of lateral sides and at least one key is positioned at or adjacent to each lateral side of the top cap.

19. A suspension assembly comprising, in combination:
a clamp assembly for use in a suspension for a vehicle axle, comprising
an axle bracket adapted to be attached to a vehicle axle, the axle bracket including a clamp assembly mounting surface;
a top cap adapted to be operatively connected to the clamp assembly mounting surface of the axle bracket to define an axle seat, wherein one of said clamp assembly mounting surface and said top cap defines a keyway and the other of said clamp assembly mounting surface and said top cap includes a key protruding therefrom and adapted to be received within the keyway when the top cap is operatively connected to said clamp assembly mounting surface; and
a deformable liner adapted to be at least partially received within the axle seat; and
a leaf spring having a spring seat adapted to be received within the axle seat, wherein the liner is positionable between the axle seat and at least a portion of the spring seat of the leaf spring.

20. The suspension assembly of claim 19, wherein the top cap comprises a plurality of keys and the clamp assembly mounting surface defines a plurality of keyways.

21. The suspension assembly of claim 20, wherein the top cap has a pair of lateral sides and at least one key is positioned at or adjacent to each lateral side of the top cap.

22. A deformable liner receivable within an axle seat of a suspension for a vehicle axle, comprising:
a top surface having a front edge and a rear edge;
a bottom surface having a front edge and a rear edge;
a cavity defined between the top surface and the bottom surface for receiving at least a portion of a leaf spring;
a pad seat defined in one of the top surface and the bottom surface; and
a deformable auxiliary pad at least partially received within the pad seat.

23. The liner of claim 22, wherein the auxiliary pad is positioned at or adjacent to the front or rear edge of the top surface or the bottom surface.

24. The liner of claim 22, wherein the auxiliary pad has a greater stiffness than the rest of the liner.

25. The liner of claim 22, further comprising:
pad seats positioned at or adjacent to the front and rear edges of the top surface and the bottom surface; and
a plurality of deformable auxiliary pads, wherein each auxiliary pad is at least partially received within one of the pad seats.

* * * * *